(No Model.)
J. P. SAVAGE.
DUMPING WAGON.
No. 281,141. Patented July 10, 1883.
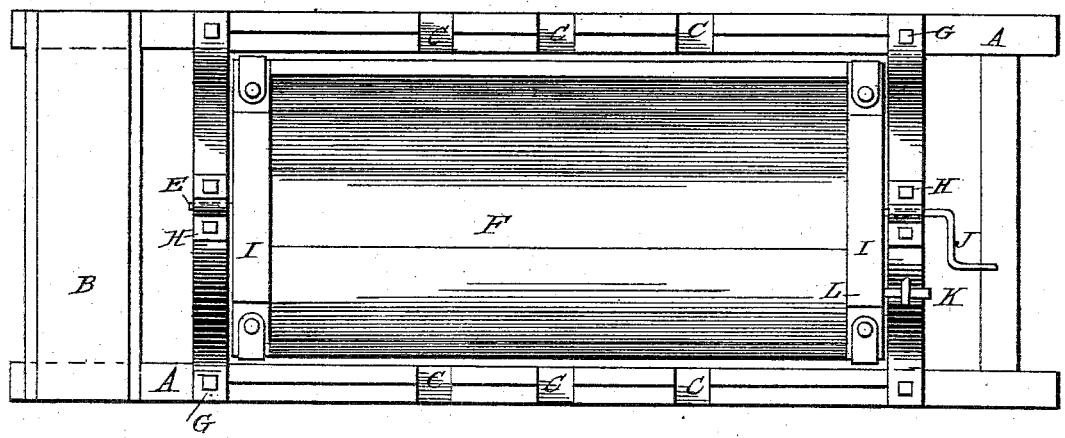
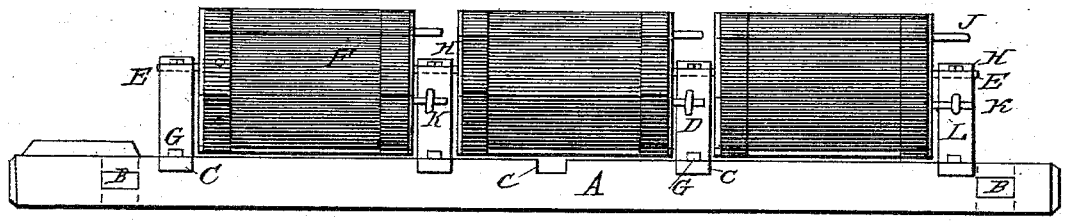
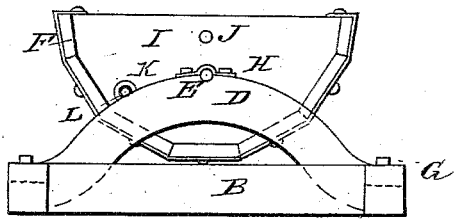
WITNESSES:
John P. Savage,
INVENTOR,
by Louis Bagger & Co.
ATTORNEYS

UNITED STATES PATENT OFFICE.

JOHN P. SAVAGE, OF SCOTLAND NECK, NORTH CAROLINA.

DUMPING-WAGON.

SPECIFICATION forming part of Letters Patent No. 281,141, dated July 10 1883.

Application filed November 27, 1882. (No model.)

*To all whom it may concern:*

Be it known that I, JOHN P. SAVAGE, of Scotland Neck, in the county of Halifax and State of North Carolina, have invented certain new and useful Improvements in Dumping-Wagons; and I do hereby declare that the following is a full, clear, and exact description of the invention, which will enable others skilled in the art to which it appertains to make and use the same, reference being had to the accompanying drawings, which form a part of this specification, and in which—

Figure 1 is a top view of my improved dumping-wagon when it is intended for dumping the whole load at once. Fig. 2 is a side view of the same arranged to dump parts of the load at a time, and Fig. 3 is an end view of the same.

Similar letters of reference indicate corresponding parts in all the figures.

My invention has relation to dumping-wagons; and it consists in the improved construction and combination of parts of the same, as hereinafter more fully described and claimed.

This wagon is chiefly intended for transporting sand, dirt, gravel, or manure where it is desired to dump it in given quantities at certain intervals, but may be used also to dump the whole load at once; and it consists of a frame composed of the side pieces, A A, and the end pieces, B B, which is mounted upon any desired style of running-gear. The side pieces, A, have notches C at intervals, in which fit cross-pieces D, which form bearings for the trunnions E of the bodies F. The cross-pieces D are arched, and may be placed with their ends in the notches C, where they are furthermore held fast by pins or bolts G. Upon the upper arched side of these cross-pieces are bearings H, in which the trunnions of the bodies rest and turn. These bodies are rounded or convex in the bottom and swing on trunnions placed as near as possible to the center of gravity in the end pieces, I, of the bodies. If it is desired to dump the whole load at once, the body shown in Fig. 1 is used, where only two cross-pieces are used, one at each end; and to dump the load a handle, J, is fastened to the end piece, by which the box or body F may be turned over and dump its contents, while one or more bolts, K, fastened upon the cross-pieces D and fitting into holes L in the end pieces of the wagon-body, hold it in its position, keeping it from overturning. If it is desired to dump the load in certain quantities at intervals, the large body is removed and as many smaller bodies as necessary are placed in their trunnions, resting in the bearings upon the additional cross-pieces, which have been inserted one between each body and resting in the notches C. These small bodies are operated in the same manner as the large, and are held by bolts upon the cross-pieces.

Having thus described my invention, I claim and desire to secure by Letters Patent of the United States—

In a dumping-wagon, the sills A A, having notches C, end pieces, B B, cross-pieces D, having bearings H and bolts K, and fitting with their ends in the notches C, and bodies F, having convex bottom swinging on trunnions E, operated by a handle, J, and held fast by bolts K, fitting in bolt-holes L, all constructed and combined to operate substantially as and for the purpose shown and set forth.

In testimony that I claim the foregoing as my own I have hereunto affixed my signature in presence of two witnesses.

JOHN PRYER SAVAGE.

Witnesses:
W. P. DARDEN,
J. Y. SAVAGE.